UNITED STATES PATENT OFFICE.

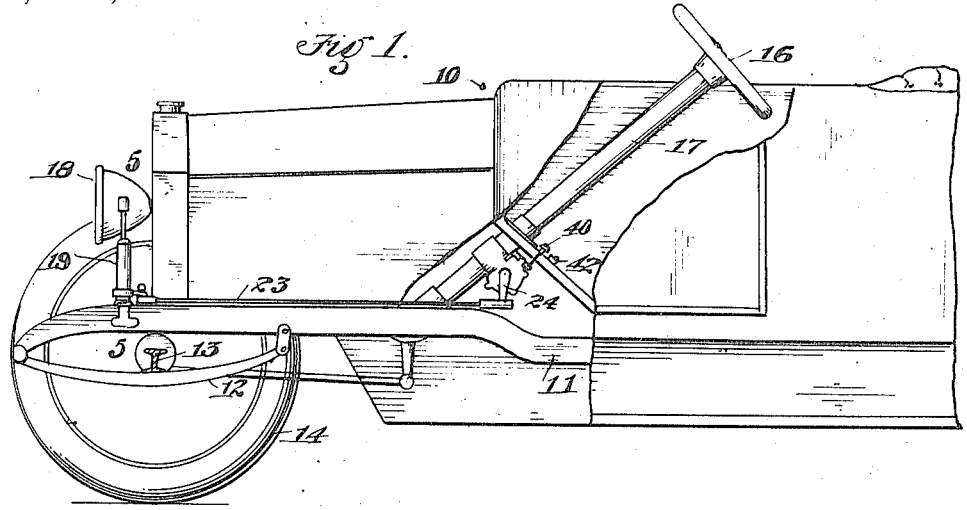
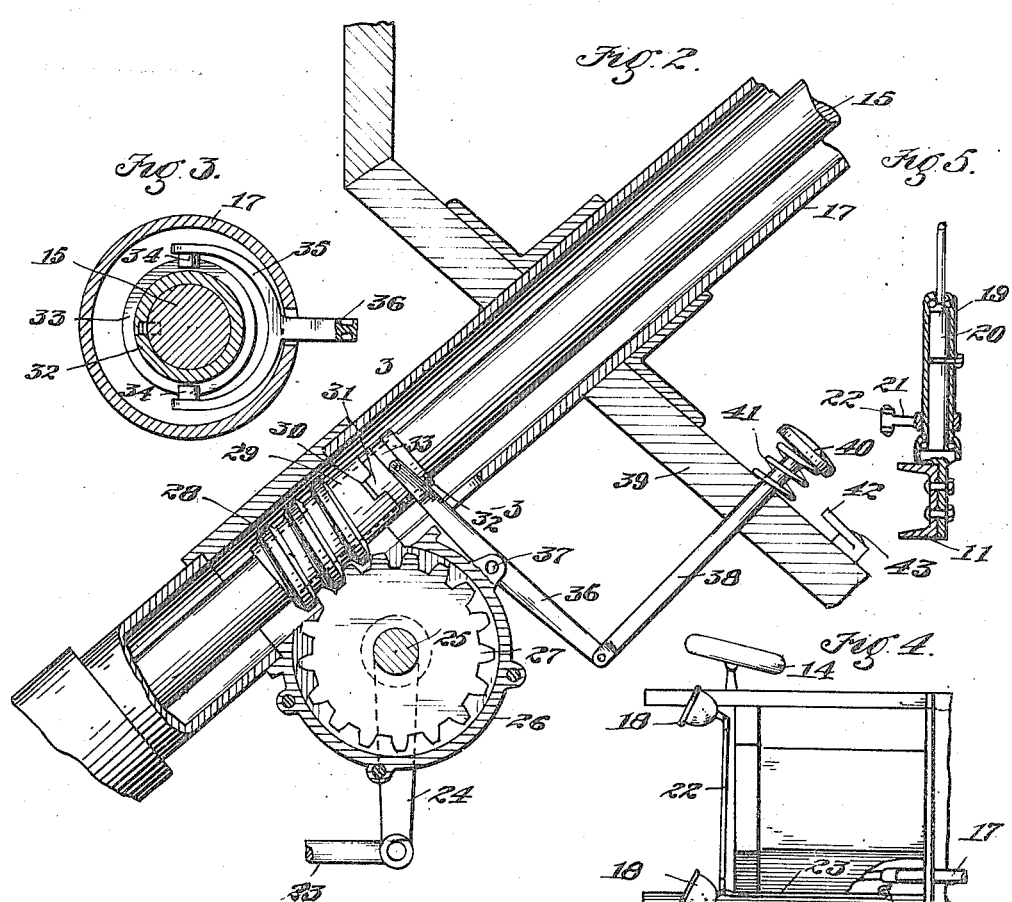

ORLANDO A. COX, OF LOS ANGELES, CALIFORNIA.

DIRIGIBLE-HEADLIGHT MECHANISM.

1,220,731. Specification of Letters Patent. Patented Mar. 27, 1917.

Application filed November 22, 1915. Serial No. 62,861.

*To all whom it may concern:*

Be it known that I, ORLANDO A. COX, a citizen of the United States, residing at Los Angeles, in the county of Los Angeles and State of California, have invented new and useful Improvements in Dirigible-Headlight Mechanisms, of which the following is a specification.

This invention relates to a dirigible headlight for vehicles and particularly pertains to a mechanism for operating same.

It is the object of this invention to provide a dirigible headlight operating mechanism which is actuated by the steering post of the vehicle and which is adapted to be thrown in and out of operative connection with the steering post as desired, and whereby the headlights may be turned laterally with the front wheels of the vehicle, so as to project the light in the path of the vehicle on traversing curves as well as when traveling straight ahead.

Another object is to provide a mechanism for operating dirigible headlights on auto vehicles, adapted to be mounted wholly on the vehicle body or frame and directly connected to the dirigible headlights, so as to obviate link or slidable connections as is required where the headlight is actuated by mechanisms controlled by the steering knuckle or connecting rod of the vehicle steering gear.

A further object is to provide a gear connection between the steering post and the dirigible headlight adapted to be thrown out of operative connection and when so thrown out will serve to hold the headlights in a fixed position.

A further object is to provide simple means for throwing the headlight controlling mechanism in and out of operation.

The invention is illustrated in the accompanying drawings in which:

Figure 1 is a view partly in section and partly in elevation of the front portion of an automobile, with parts broken away, showing the application of the invention.

Fig. 2 is a detail in section and elevation illustrating the headlight controlling mechanism on the steering post and showing the means for throwing the mechanism in and out of operation.

Fig. 3 is an enlarged detail section, as seen on the line 3—3 of Fig. 2 in the direction indicated by the arrows.

Fig. 4 is a plan view showing the manner of connecting the dirigible headlights to their actuating mechanism on the steering post and showing how the headlights are turned laterally with the steering wheels.

Fig. 5 is a detail in section and elevation on the line 5—5 of Fig. 1 illustrating the mounting of the headlights.

More specifically, 10 indicates the body of an automobile or like vehicle, supported on a frame 11 carried on the usual running gear; the forward end of the frame 11 being here shown as supported upon springs 12 carried by the front axle 13, which axle is supported on the forward wheels 14 connected with the axle by the usual steering knuckles, as is common in vehicle construction, not necessary to be here shown. A steering post 15 provided with a steering wheel 16 and mounted in a steering column 17 is connected to the forward vehicle wheels 14 in the usual manner, by which the latter are turned laterally to direct the course of travel of the vehicle.

The present invention resides in a mechanism operated by the steering post 15 for turning the headlights 18 on the forward end of the vehicle in unison with the lateral turning of the wheels 14.

In carrying out the invention, the headlights 18 are carried on tubular sleeves 19 revolubly mounted on studs 20 carried by the frame 11 or other portion of the vehicle, as particularly shown in Fig. 5. Rigidly attached to the sleeves 19 are arms 21 linked together by a connecting rod 22, as shown in Fig. 4, and connecting with the arm 21 on the sleeve of the lamp on the side of the vehicle on which the steering post is mounted is a connecting rod 23 which is pivoted to the lower end of a dependent crank arm 24, as shown in Figs. 1 and 2. The crank arm 24 is mounted on a shaft 25 supported in suitable bearings in a housing 26. Mounted on the shaft 25 within the housing 26 is a worm gear 27 which meshes with a worm pinion 28 loosely mounted on the steering post 15. The worm pinion 28 is formed on a sleeve 29 formed with an end depression 30 adapted to be engaged by a projection 31 on a slidable sleeve 32 carried by the post 15 and splined thereon. The sleeve 32 constitutes a clutch which, when engaged with the sleeve 29, locks the latter in relation to the post 15 so that when the post is turned the worm 28 will revolve therewith to rotate the worm gear 27. The sleeve 32 is formed with an annular channel 33 into which oppositely disposed projections 34 on a yoke 35 project; the yoke 35 being formed on a lever 36 pivoted at 37 on the housing 26. The outer end of the lever 36 connects with a rod 38 leading upward through the floor 39 of the vehicle and having a head member 40 thereon adapted to be pressed by the foot of the driver of the vehicle to throw the clutch sleeve 32 out of engagement with the worm pinion sleeve. Means are provided for normally maintaining the sleeve 32 in engagement with the sleeve 29 which is here shown as consisting of a spring 41 encircling the rod 38 and bearing between the floor 39 and the head member 40 to exert an upward pressure on the latter and thereby exert an inward pressure on the cam sleeve to maintain the latter in the position shown in Fig. 2. Means are further provided for locking the sleeve 32 out of engagement with the sleeve 29 when it is desired to disconnect the lamp actuating mechanism, and is here shown as consisting of an arm 42 pivoted at 43 on the floor 39 adapted to extend over the head 40 in engagement with the latter when in its lowermost position, thus holding the sleeve 32 in its outermost position.

In the operation of the invention, when it is desired to dispose the lamp actuating mechanism in operative connection with the steering post 15 the locking arm 42 is disengaged from the head of the rod 38 to permit the spring 41 to act on the rod 38 and lever 36 and advance the sleeve 32 into engagement with the sleeve 29. Rotation of the steering post 15 by the hand wheel 16 will then operate through the clutch sleeve 32, sleeve 29, worm pinion 28 and worm gear 27, to advance or retract the dependent arm 24 and thereby oscillate the lamps in unison with each other and with the lateral turning movement of the wheels as effected by the steering post; the lamps being rocked on their pivotal mountings through the medium of the connecting rod 23 leading from the arm 24 to the arm 21, and through the connecting rod 22 connecting the arms 21 of the pair of lamps. A positive connection is thus formed between the steering post and the lamps which will cause the lamps to turn sidewise on turning of the steering post so that the light projected from the lamps will extend in the path of travel of the vehicle.

When it is desired to throw the lamp actuating mechanism out of operative connection with the steering post, as when traveling in the day time, the rod 38 is depressed and the head thereof engaged by the arm 42, thus disposing the projection 31 on the sleeve 32 out of engagement with the depression 30 on the sleeve 29. The steering post 15 may then be turned without transmitting rotary motion to the worm pinion 28 and its complementary gear 27. The lamps 18 will then be held against movement by the interlocking engagement between the worm pinion 28 and the worm gear 27.

It is manifest that the detail construction of the invention may be varied as occasion may require in adapting it for use on various types of auto vehicles.

What I claim is:

1. In a headlight operating mechanism, the combination with the steering shaft of an automobile, of a headlight mounted for horizontal movement, transmission means operated by the steering shaft whereby the headlight may be horizontally swung when the steering shaft is rotated, and a clutch mechanism adapted to render the transmission mechanism inoperative and thereby allow said transmission means to become interlocked to prevent movement of the headlight during said inoperation.

2. In a headlight operating mechanism, the combination with the steering shaft of an automobile steering gear, of headlights pivotally mounted upon the automobile for horizontal movement, a worm gear positioned upon said steering shaft, a worm wheel in fixed operative relation thereto, connecting means whereby rotation of the worm wheel will horizontally swing said headlights, and a clutch mechanism adapted to be actuated to lock said worm gear to the steering shaft and thereby insure the rotation of the worm wheel upon rotation of the steering shaft.

3. In a headlight operating mechanism, the combination with the steering shaft of a vehicle steering gear, of a pair of horizontally pivoted headlights, a driving worm gear loosely mounted upon the steering shaft, a driven worm wheel in mesh with said gear mounted in fixed relation thereto, a clutch member secured to said worm gear, a slidable clutch member mounted upon the steering shaft, and means whereby said slidable clutch member may be brought into engagement with said gear clutch member to lock it to the steering shaft and thereby produce a swinging movement of the headlights upon rotation of the steering shaft.

In testimony whereof I have signed my name to this specification.

ORLANDO A. COX.